(12) United States Patent
Mcleod et al.

(10) Patent No.: US 8,208,238 B1
(45) Date of Patent: Jun. 26, 2012

(54) APPARATUS FOR ORIENTING SOFT-UNDERLAYER DEPOSITION

(75) Inventors: Paul Stephen Mcleod, Berkeley, CA (US); Charles F. Brucker, Pleasanton, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 802 days.

(21) Appl. No.: 12/053,138

(22) Filed: Mar. 21, 2008

(51) Int. Cl.
    *H01H 47/00* (2006.01)
(52) U.S. Cl. .......................................... 361/143
(58) Field of Classification Search ................... 361/143
    See application file for complete search history.

(56) References Cited

U.S. PATENT DOCUMENTS

| | | | |
|---|---|---|---|
| 5,047,130 A * | 9/1991 | Akao et al. ............... | 204/192.12 |
| 5,683,561 A * | 11/1997 | Hollars et al. ............ | 204/298.25 |
| 5,846,328 A | 12/1998 | Aruga et al. | |
| 7,846,564 B2 * | 12/2010 | Li et al. ..................... | 428/828.1 |
| 2001/0034004 A1 | 10/2001 | Kitamura | |
| 2002/0136930 A1* | 9/2002 | Oikawa et al. ......... | 428/694 TM |
| 2003/0099868 A1 | 5/2003 | Tanahashi et al. | |
| 2004/0265570 A1* | 12/2004 | Takahashi et al. ........... | 428/328 |
| 2006/0272937 A1 | 12/2006 | McLeod et al. | |
| 2007/0072011 A1* | 3/2007 | Li et al. ..................... | 428/828.1 |

FOREIGN PATENT DOCUMENTS

JP 61-204318 9/1986

\* cited by examiner

*Primary Examiner* — Ronald W Leja
(74) *Attorney, Agent, or Firm* — Hollingsworth & Funk, LLC

(57) ABSTRACT

An apparatus for reorienting the magnetic anisotropy of the soft underlay of a magnetic recording disc having a diameter less than that of the pallet, which operates by first heating the disc, then using a heat transfer plate to cool the disc in the presence of a magnetic field having a radial direction emanating from the center of the magnetic recording disc.

20 Claims, 6 Drawing Sheets

← Protective overcoat 23

← Magnetic layer 22

← Underlayer 21

← Substrate 20

← Underlayer 21'

← Magnetic layer 22'

← Protective overcoat 23'

Figure 6. Magnetic Field Magnitude at the Surface of Disc.
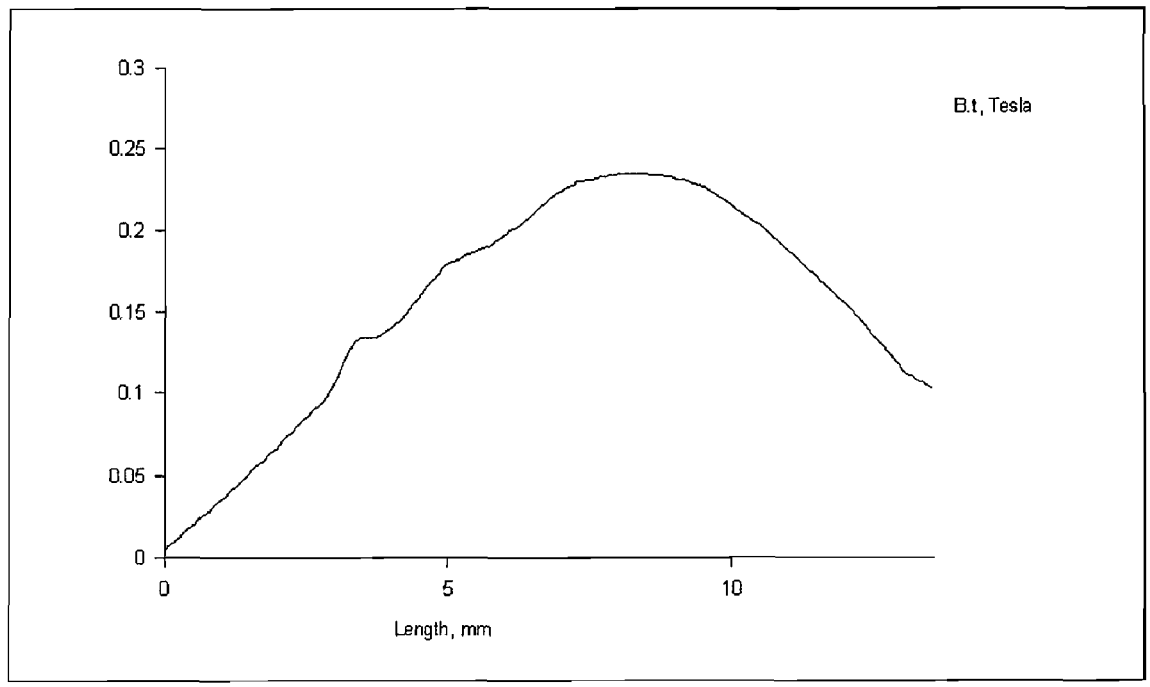
Figure 7. Magnetic Array
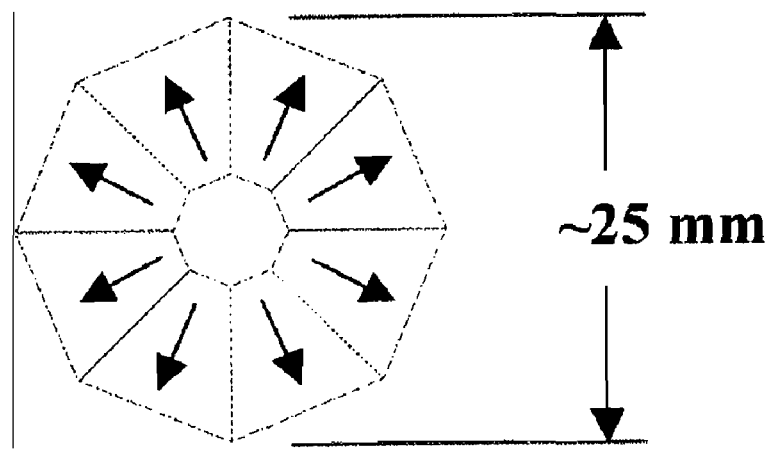

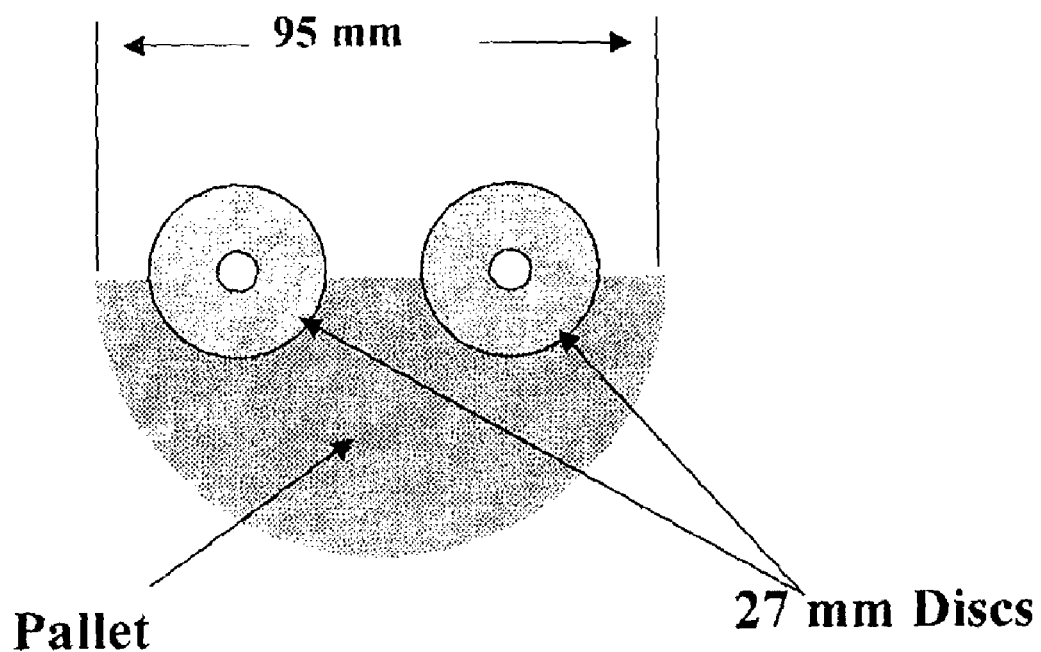
Figure 8. Small Form-Factor Holding Apparatus.

APPARATUS FOR ORIENTING SOFT-UNDERLAYER DEPOSITION

RELATED APPLICATIONS

None.

BACKGROUND

None.

SUMMARY

An apparatus for reorienting the magnetic anisotropy of the soft underlay of a magnetic recording disc having a diameter less than that of the pallet, which operates by first heating the disc, then using a heat transfer plate to cool the disc in the presence of a magnetic field having a radial direction emanating from the center of the magnetic recording disc.

Embodiments of the invention relate to an apparatus and method for reorienting the magnetic anisotropy of a magnetic recording disc, including a pallet holding a plurality of magnetic recording discs, in which at least a portion of the plurality of magnetic recording discs is smaller than the pallet; a plurality of heat transfer plates having a contacting surface; and a plurality of magnetic sources adjacent to at least a portion of the plurality of heat transfer plates, in which the magnetic sources individually have a magnetic center and provide a magnetic field having a radial direction emanating from the magnetic center, in which the heat transfer plate is configured to produce a radial magnetic pattern in a soft underlayer of a magnetic recording disc having a diameter less than that of the pallet.

As will be realized, this invention is capable of other and different embodiments, and its details are capable of modifications in various obvious respects, all without departing from this invention. Accordingly, the drawings and description are to be regarded as illustrative in nature and not as restrictive. These and various other features and advantages will be apparent from a reading of the following detailed description.

BRIEF DESCRIPTION OF THE DRAWINGS

FIG. 6 is a calculated view of the magnetic field magnitude at the surface of a disc.

FIG. 7 shows the magnetic array and resultant magnetic field.

FIG. 8 shows a pallet, which is used as a holding apparatus for the small form-factor discs.

DETAILED DESCRIPTION

Figure 1:
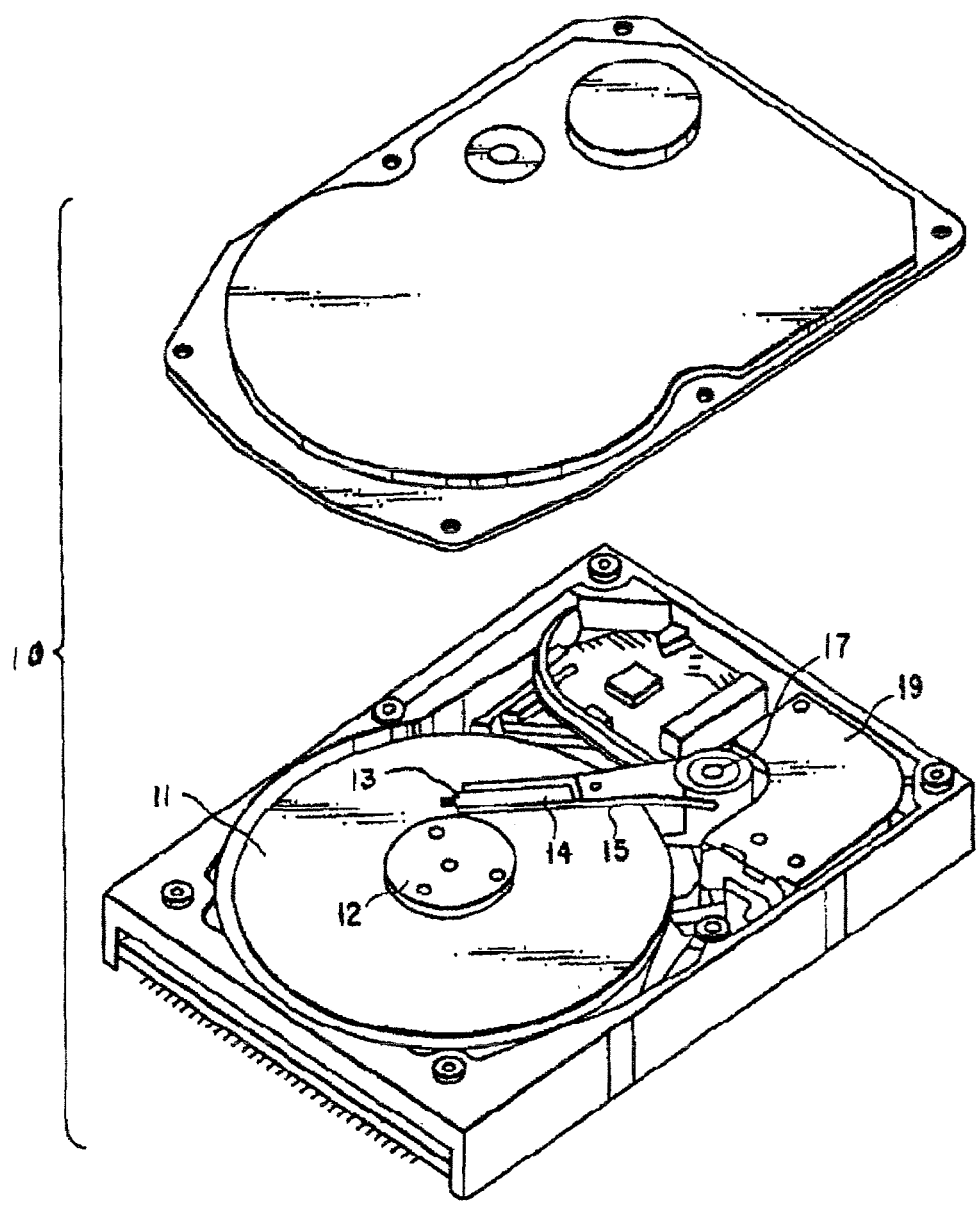
FIG. 1 is a view of a magnetic disk drive of the related art.

Embodiments of the invention relate to perpendicular recording media, such as thin film magnetic recording disks having perpendicular recording, and to a method of manufacturing the media. Embodiments of the invention have particular applicability to high areal density magnetic recording media exhibiting low noise.

Embodiments of the invention describe an apparatus for making a perpendicular magnetic recording medium having a substrate and a magnetic underlayer on the substrate, the magnetic underlayer having an easy axis of magnetization substantially directed in a radial or transverse direction, and a process for manufacturing the perpendicular magnetic recording medium having such an axis of magnetization.

One embodiment of the apparatus uses the magnetic field produced by an array of permanent magnets to align the magnetic field of the soft underlayer to the desired magnetic orientation. Another embodiment uses electromagnets to align the magnetic field of the soft underlayer to the desired magnetic orientation.

The increasing demands for higher areal recording density impose increasingly greater demands on thin film magnetic recording media in terms of remanent coercivity (Hr), magnetic remanence (Mr), coercivity squareness (S*), medium noise, i.e., signal-to-medium noise ratio (SMNR), and narrow track recording performance. It is extremely difficult to produce a magnetic recording medium satisfying such demanding requirements.

The linear recording density can be increased by increasing the Hr of the magnetic recording medium, and by decreasing the medium noise, as by maintaining very fine magnetically non-coupled grains. Medium noise in thin films is a dominant factor restricting increased recording density of high-density magnetic hard disk drives, and is attributed primarily to inhomogeneous grain size and intergranular exchange coupling. Accordingly, in order to increase linear density, medium noise must be minimized by suitable microstructure control.

According to the domain theory, a magnetic material is composed of a number of submicroscopic regions called domains. Each domain contains parallel atomic moments and is always magnetized to saturation, but the directions of magnetization of different domains are not necessarily parallel. In the absence of an applied magnetic field, adjacent domains may be oriented randomly in any number of several directions, called the directions of easy magnetization, which depend on the geometry of the crystal. The resultant effect of all these various directions of magnetization may be zero, as is the case with an unmagnetized specimen. When a magnetic filed is applied, the domains most nearly parallel to the direction of the applied field grow in size at the expense of the others. This is called boundary displacement of the domains or the domain growth. A further increase in magnetic field causes more domains to rotate and align parallel to the applied field. When the material reaches the point of saturation magnetization, no further domain growth would take place on increasing the strength of the magnetic field.

A magnetic material is said to possess a uniaxial anisotropy when all domains are oriented in the same direction in the material. On the other extreme, a magnetic material is said to be isotropic when all domains are oriented randomly.

The ease of magnetization or demagnetization of a magnetic material depends on the crystal structure, grain orientation, the state of strain, and the direction and strength of the magnetic field. The magnetization is most easily obtained along the easy axis of magnetization but most difficult along the hard axis of magnetization.

Magnetic quenching to achieve a desired magnetic orientation may be achieved using various apparatuses and methods.

"Anisotropy energy" is the difference in energy of magnetization for these two extreme directions, namely, the easy axis of magnetization and the hard axis of magnetization. For example, a single crystal of iron, which is made up of a cubic array of iron atoms, tends to magnetize in the directions of the cube edges along which lie the easy axes of magnetization. A single crystal of iron requires about $1.4 \times 10^5$ ergs/cm$^3$ (at room temperature) to move magnetization into the hard axis of magnetization, which is along a cubic body diagonal.

The anisotropy energy $U_A$ could be expressed in an ascending power series of the direction cosines between the magnetization and the crystal axes. For cubic crystals, the lowest-order terms take the form of Equation (1), $$U_A = K_1(\alpha_1^2\alpha_2^2 + \alpha_2^2\alpha_3^2 + \alpha_3^2\alpha_1^2) + K_2(\alpha_1^2\alpha_2^2\alpha_3^2) \quad (1)$$

where $\alpha_1$, $\alpha_2$ and $\alpha_3$ are direction cosines with respect to the cube, and $K_1$ and $K_2$ are temperature-dependent parameters characteristic of the material, called anisotropy constants.

Anisotropy constants can be determined from (1) analysis of magnetization curves, (2) the torque on single crystals in a large applied field, and (3) single crystal magnetic resonance.

The total energy of a magnetic substance depends upon the state of strain in the magnetic material and the direction of magnetization through three contributions. The first two consist of the crystalline anisotropy energy of the unstrained lattice plus a correction that takes into account the dependence of the anisotropy energy on the state of strain. The third contribution is that of the elastic energy, which is independent of magnetization direction and is a minimum in the unstrained state. The state of strain of the crystal will be that which makes the sum of the three contributions of the energy a minimum. The result is that, when magnetized, the lattice is always distorted from the unstrained state, unless there is no anisotropy.

"Magnetostriction" refers to the changes in dimension of a magnetic material when it is placed in magnetic field. It is caused by the rotation of domains of a magnetic material under the action of magnetic field. The rotation of domains gives rise to internal strains in the material, causing its contraction or expansion.

The requirements for high areal density impose increasingly greater requirements on magnetic recording media in terms of coercivity, remanent squareness, low medium noise and narrow track recording performance. It is extremely difficult to produce a magnetic recording medium satisfying such demanding requirements, particularly a high-density magnetic rigid disk medium for longitudinal and perpendicular recording. The magnetic anisotropy of longitudinal and perpendicular recording media makes the easily magnetized direction of the media located in the film plane and perpendicular to the film plane, respectively. The remanent magnetic moment of the magnetic media after magnetic recording or writing of longitudinal and perpendicular media is located in the film plane and perpendicular to the film plane, respectively.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material which comprises a mixture of amorphous and crystalline materials, and ceramic materials. Glass-ceramic materials do not normally exhibit a crystalline surface. Glasses and glass-ceramics generally exhibit high resistance to shocks.

Almost all the manufacturing of a disk media takes place in clean rooms where the amount of dust in the atmosphere is kept very low, and is strictly controlled and monitored. After one or more cleaning processes on a non-magnetic substrate, the substrate has an ultra-clean surface and is ready for the deposition of layers of magnetic media on the substrate. The apparatus for depositing all the layers needed for such media could be a static sputter system or a pass-by system, where all the layers except the lubricant are deposited sequentially inside a suitable vacuum environment.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. The rotary actuator could have several suspensions and multiple magnetic heads to allow for simultaneous recording and reproduction on and from both surfaces of each medium.

An electromagnetic converting portion (not shown) for recording/reproducing information is mounted on the magnetic head 13. The arm 15 has a bobbin portion for holding a driving coil (not shown). A voice coil motor 19 as a kind of linear motor is provided to the other end of the arm 15. The voice motor 19 has the driving coil wound on the bobbin portion of the arm 15 and a magnetic circuit (not shown). The magnetic circuit comprises a permanent magnet and a counter yoke. The magnetic circuit opposes the driving coil to sandwich it. The arm 15 is swingably supported by ball bearings (not shown) provided at the upper and lower portions of a pivot portion 17. The ball bearings provided around the pivot portion 17 are held by a carriage portion (not shown).

A magnetic head support mechanism is controlled by a positioning servo driving system. The positioning servo driving system comprises a feedback control circuit having a head position detection sensor (not shown), a power supply (not shown), and a controller (not shown). When a signal is supplied from the controller to the respective power supplies based on the detection result of the position of the magnetic head 13, the driving coil of the voice coil motor 19 and the piezoelectric element (not shown) of the head portion are driven.

Figure 2:
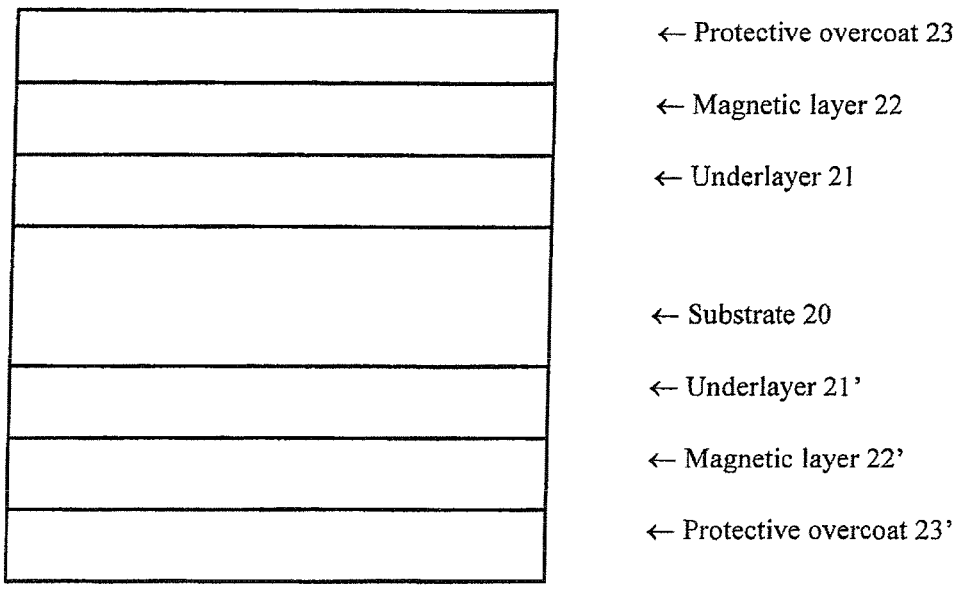
FIG. 2 is a schematic representation of the film structure in accordance with a magnetic recording medium of the related art.

A cross sectional view of a conventional longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-alloy, a magnetic layer 22, 22', typically comprising a cobalt (Co)-base alloy, and a protective overcoat 23, 23', typically containing carbon. Conventional practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-alloy underlayer.

Figure 3:
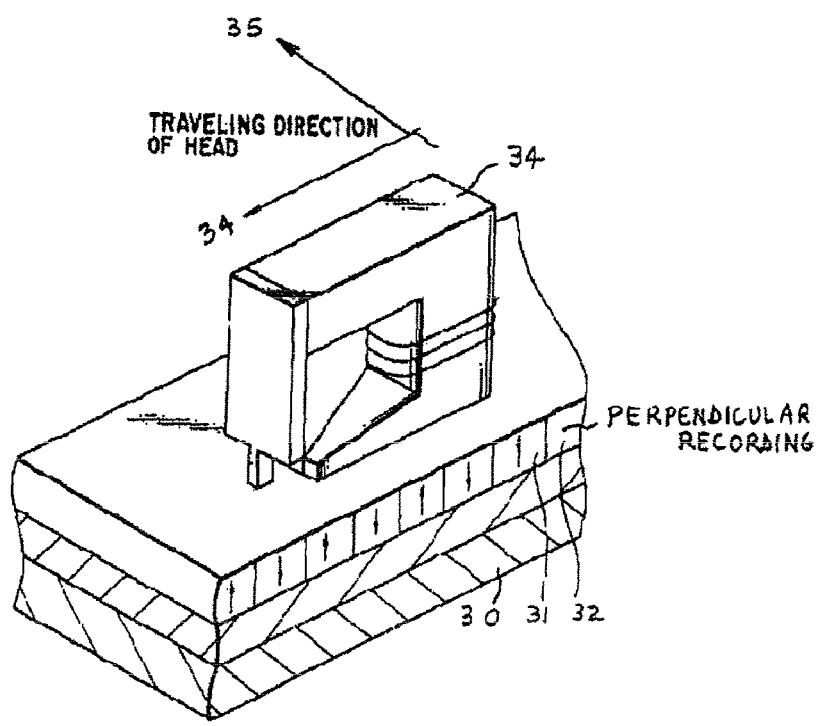
FIG. 3 is perspective view of a magnetic head and a magnetic disk of the related art.

A conventional perpendicular recording disk medium, shown in FIG. 3, is similar to the longitudinal recording medium depicted in FIG. 2, but with the following differences. First, a conventional perpendicular recording disk medium has soft magnetic underlayer 31 of an alloy such as Permalloy instead of a Cr-containing underlayer. Second, as shown in FIG. 3, magnetic layer 32 of the perpendicular recording disk medium comprises domains oriented in a direction perpendicular to the plane of the substrate 30. Also, shown in FIG. 3 are the following: (a) read-write head 33 located on the recording medium, (b) traveling direction 34 of head 33 and (c) transverse direction 35 with respect to the traveling direction 34.

The underlayer and magnetic layer are conventionally sequentially sputter deposited on the substrate in an inert gas atmosphere, such as an atmosphere of pure argon. A conventional carbon overcoat is typically deposited in argon with nitrogen, hydrogen or ethylene. Conventional lubricant topcoats are typically about 20 Å thick.

It is recognized that the magnetic properties, such as Hr, Mr, S* and SMNR, which are critical to the performance of a magnetic alloy film, depend primarily upon the microstructure of the magnetic layer which, in turn, is influenced by one or more underlying layers on which it is deposited. It is also recognized that an underlayer made of soft magnetic films is useful in perpendicular recording media because a relatively thick (compared to magnetic layer) soft underlayer provides a return path for the read-write head and amplifies perpendicular component of the write field in the recording layer. However, Barkhausen noise caused by domain wall motions in the soft underlayer can be a significant noise source. Since the orientation of the domains can be controlled by the uniaxial anisotropy, introducing a uniaxial anisotropy in the soft underlayer would be one way to suppress Barkhausen noise. When the uniaxial anisotropy is sufficiently large, the domains would preferably orient themselves along the anisotropy axis.

The uniaxial anisotropy could be controlled in several ways in the soft magnetic thin film materials. The most frequently applied methods are post-deposition annealing while applying a magnetic field and applying a bias magnetic field during deposition. However, both methods can cause complications in the disk manufacturing process.

A "soft magnetic" material is material that is easily magnetized and demagnetized. As compared to a soft magnetic material, a "hard magnetic" material is one that neither magnetizes nor demagnetizes easily. The problem of making soft magnetic materials conventionally is that they usually have many crystalline boundaries and crystal grains oriented in many directions. In such metals, the magnetization process is accompanied by much irreversible Block wall motion and by much rotation against anisotropy, which is usually irreversible. The preferred soft material would be a material fabricated by some inexpensive technique that results in all crystal grains being oriented in the same or nearly the same direction. However, "all grains" oriented in the same direction would be very difficult to produce and would not be the "preferred soft material." In fact, very high anisotropy is not desirable.

A single disk deposition system includes a sputtering chamber having a sputter target located outside of the outer diameter of the disc. Atoms arrive obliquely to the plane of the disk, producing thin films with columnar grains that are magnetically oriented towards the vapor source and at a non-zero angle with respect to normal (i.e., a radial residual anisotropy). However, in the soft underlayer ("SUL") employed in perpendicular media, the preferred magnetic orientation is toward the rim of the disc. Magnetic field induced pair ordering can also give rise to anisotropy in soft magnetic alloys. For circular static sputter sources as mentioned above, this anisotropy tends to be radial as well, reinforcing the shape anisotropy arising from oblique deposition.

However, when the same cathodes are used to deposit media on multiple small form-factor discs (FIG. 8) that are arranged about the center of the sputter cathode, neither the angle of the incident vapor nor the magnetic field in the plane of the disc is symmetrical with the axis of rotation of the discs. As a consequence, the media crystal orientation has little radial anisotropy. Thus a means is needed to orient the microcrystals in the radial direction. To mitigate this problem, the SUL layer is reoriented as described herein. Another potential benefit is that the thickness of the SUL layer can be reduced as the anisotropy within the SUL layer increases, thereby allowing a thinner SLTL layer to be utilized; a potential manufacturing cost saving.

Using an apparatus similar to that shown in FIG. 8, without a step of reorienting the SUL layer, would produce a difference in the anisotropy orientation unless the disks were annealed as described herein.

Embodiments of the invention provide an apparatus for reorienting the magnetic anisotropy in the soft underlayer of a magnetic recording media suitable for high areal recording density exhibiting high SMNR. Embodiments of the invention also disclose a method of using the disclosed apparatus to achieve the desired orientation of the magnetic anisotropy. The underlayer is "soft" because it made of a soft magnetic material and it is called an "underlayer" because it resides under a recording layer.

Figure 4:
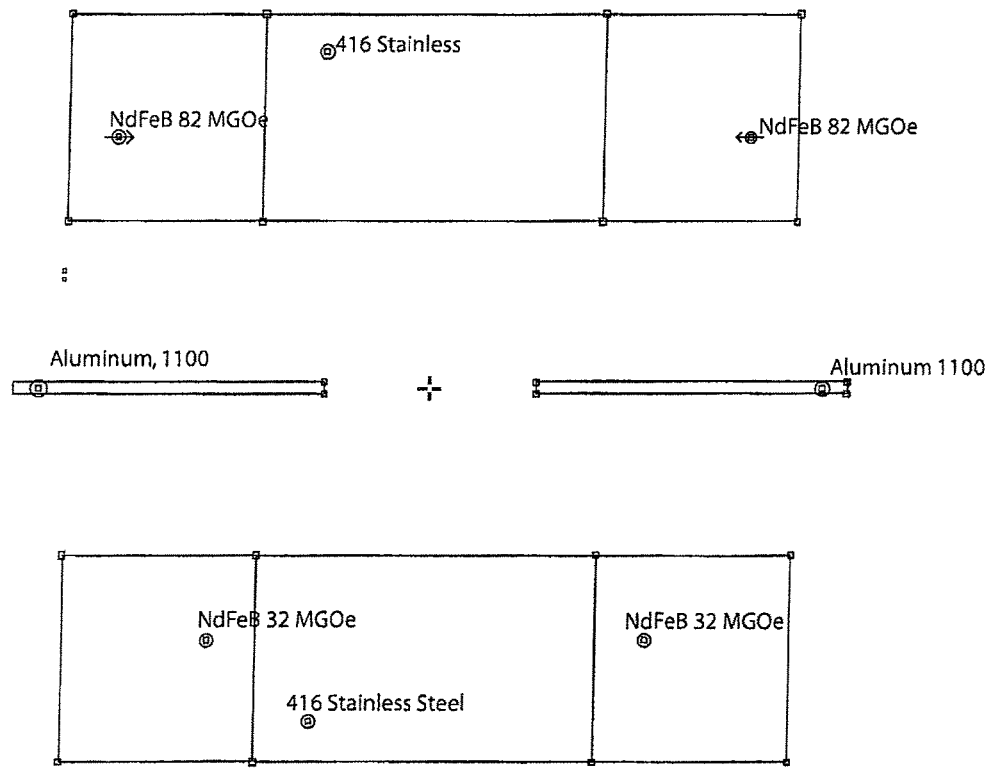
FIG. 4 is a schematic view of a magnet array and a disc cross-sectional view of an embodiment of this invention.

In this apparatus, magnetic layers deposited on multiple small form-factor discs (e.g., 27 mm outer diameter) that lack the requisite radial anisotropy because they were deposited in a system designed for larger (e.g., 95 mm outer diameter) single discs, can be reoriented properly. This is done in a 2-step process where the discs are first heated in a standard heating station, then transferred to a cooling station where they are cooled in a magnetic field. Cooling the discs is equivalent to transferring heat out of the discs, therefore the heat transfer plates may also be referred to as cooling plates. A separate magnetic field is provided for each disc (see FIG. 4).

The heating station may be the MDP-250, manufactured by Intevac, Inc., or its functional equivalent. The MDP-250 is a magnetic media deposition system which includes multiple process stations, including a heating station. The method described herein may be used with any heating station that provides substantially the same heating functionality as the MDP-250.

The cooling station may be the Seagate-designed PCS-3, or its functional equivalent. The method described herein may be used with any cooling station that provides substantially the same cooling functionality as the PCS-3.

In a preferred embodiment, each magnetic field is generated by small permanent magnetic arrays which are embedded in the faces of the cooling station heat transfer plates (see FIG. 6).

In a second embodiment, each magnetic field is generated by electromagnets. However, this embodiment has the disadvantage of being more complicated and more expensive.

The magnets embedded in the faces of the cooling station heat transfer plates may comprise any combination of permanent magnets or electromagnets.

Figure 5:
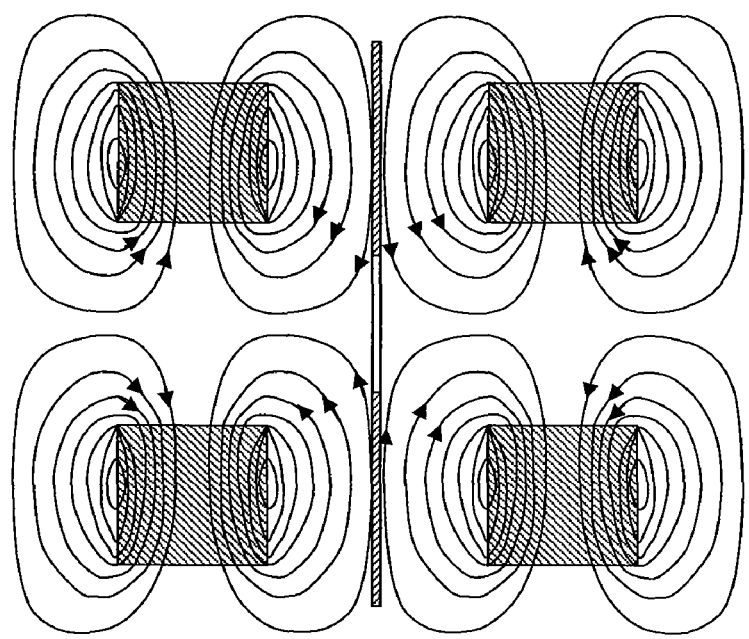
FIG. 5 is a view of the calculated magnetic field at each disk.

The cooling plates and magnets are then moved into position before injecting a gas that cools the discs. While cooling, a radial magnetic field (FIGS. 3-5) is maintained at the surface of the disc. The magnetic field is reduced when the plates are separated prior to removing the discs from the chamber.

In another embodiment, the cooling function does not require heat transfer plates, but instead relies on convection, radiation, or any combination thereof while maintaining the appropriate magnetic field. Typically, the discs will cool more slowly if there is no conduction through the heat transfer plates, therefore this embodiment is not preferred.

The term "induced" is used because the magnetic field is an external factor that causes anisotropy. Unlike magnetic anisotropy caused by magnetocrystalline or shape anisotropy, anisotropy formed by a magnetic field is considered as induced anisotropy.

In accordance with embodiments of this invention, the substrates that may be used include glass, glass-ceramic, NiP/aluminum, metal alloys, plastic/polymer material, ceramic, glass-polymer, composite materials or other non-magnetic materials.

A soft underlayer should preferably be made of soft magnetic materials and the recording layer should preferably be made of hard magnetic materials. A soft underlayer is relatively thick compared to other layers. Any layers between the soft underlayer and the recording layer is called interlayer or intermediate layer. An interlayer can be made of more than one layer of non-magnetic materials. The purpose of the interlayer is to prevent an interaction between the soft magnetic underlayer and recording layer. An interlayer could also promote the desired properties of the recording layer. Conventional (longitudinal) media do not have a soft magnetic underlayer. Therefore, the layers named as "underlayer," "seed layer," "sub-seed layer," or "buffer layer" of longitudinal media are somewhat equivalent to the intermediate layer (s) of perpendicular media.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Where the term "plurality" is used, that term shall be construed to include the quantity of one, unless otherwise stated. The entire disclosure of the patents and publications referred in this application are hereby incorporated herein by reference. Finally, the implementations described above and other implementations are within the scope of the following claims.

The invention claimed is:

1. An apparatus for reorienting the magnetic anisotropy of magnetic recording discs, comprising:
   a single disc deposition system comprising:
      a sputtering chamber and a circular static sputter target configured for depositing magnetic material on a surface of a disc substrate having a first form-factor, such that a magnetic anisotropy of the magnetic material on the disc surface tends to be radially oriented; and
      the sputtering chamber adapted to deposit magnetic material concurrently on a surface of each of a plurality of magnetic recording discs having a second form-factor smaller than the first form-factor, such that a magnetic anisotropy of the magnetic material on the surface of each of the plurality of magnetic recording discs having the second form-factor has little radial orientation;
   a pallet sized to hold the disc substrate having the first form-factor, the pallet adapted to hold the plurality of magnetic recording discs having the second form-factor;
   a plurality of heat transfer plates, the plurality of heat transfer plates including a contacting surface; and
   a plurality of magnetic sources adjacent to at least a portion of the plurality of heat transfer plates, wherein the magnetic sources individually have a magnetic center and provide a magnetic field having a radial direction emanating from the magnetic center, wherein each of the heat transfer plate is configured to produce a radial magnetic pattern in a soft underlayer of one of the plurality of magnetic recording discs having the second form-factor.

2. The apparatus of claim 1, wherein the size of at least a portion of the plurality of magnetic sources is predetermined from the size of the magnetic recording discs having the second form-factor.

3. The apparatus of claim 1, wherein a size of the magnetic sources producing the magnetic field is larger than a size of the magnetic recording discs having the second form-factor.

4. The apparatus of claim 1, wherein a size of the magnetic source producing the magnetic field is smaller or comparable to a diameter of the magnetic recording discs having the second form-factor.

5. The apparatus of claim 1, wherein the magnetic sources are circular.

6. The apparatus of claim 1, wherein at least a portion of the plurality of magnetic sources comprise an array of permanent magnets.

7. The apparatus of claim 1, wherein at least a portion of the plurality of magnetic sources comprise electromagnets.

8. The apparatus of claim 1, wherein at least a portion of the plurality of magnetic sources is flush with the contacting surface of the heat transfer plates.

9. The apparatus of claim 1, wherein at least a portion of the plurality of magnetic sources is embedded within the contacting surface of the heat transfer plates.

10. The apparatus of claim 1, wherein the disc substrate having the first form-factor has an outer diameter of about 95 mm, and each of the plurality of magnetic recording discs has an outer diameter of about 27 mm.

11. A method for manufacturing a plurality of magnetic recording discs for perpendicular recording, having a desired radial magnetic anisotropy, comprising:
   providing the apparatus of claim 1, wherein the pallet holds a plurality of magnetic recording discs;
   heating the plurality of magnetic recording discs above a desired warming temperature;
   cooling the plurality of magnetic recording discs below a desired cooling temperature using the plurality of heat transfer plates, wherein the plurality of magnetic recording discs are exposed to a magnetic field until cooled below the desired cooling temperature.

12. The method of claim 11, wherein at least a portion of the plurality of magnetic recording discs are overlying at least a portion of the plurality of magnetic sources.

13. The method of claim 11, wherein the magnetic disc are placed off-center with respect to the magnetic source.

14. An apparatus for reorienting the magnetic anisotropy of a magnetic recording discs, comprising:
   a single disc deposition system configured for depositing magnetic material on a surface of a disc substrate having a first form-factor, such that a magnetic anisotropy of the magnetic material on the disc surface tends to be radially oriented, the deposition system adapted to deposit magnetic material concurrently on a surface of each of a plurality of magnetic recording discs having a second form-factor smaller than the first form-factor, such that a magnetic anisotropy of the magnetic material on the surface of each of the plurality of magnetic recording discs having the second form-factor has little radial orientation;

a pallet adapted to hold the plurality of magnetic recording discs having the second form-factor; and a plurality of magnetic sources, wherein the magnetic sources individually have a magnetic center and provide a magnetic field having a radial direction emanating from the magnetic center, wherein each of the plurality of magnetic sources is configured to produce a radial magnetic pattern in a soft underlayer of one of the plurality of magnetic recording discs having the second form-factor.

15. The apparatus of claim 14, wherein the size of at least a portion of the plurality of magnetic sources is predetermined from the size of the magnetic recording discs having the second form-factor.

16. The apparatus of claim 14, wherein a size of the magnetic sources producing the magnetic field is larger than a size of the magnetic recording discs having the second form-factor.

17. The apparatus of claim 14, wherein the magnetic sources are circular.

18. The apparatus of claim 14, wherein at least a portion of the plurality of magnetic sources comprise an array of permanent magnets.

19. The apparatus of claim 14, wherein at least a portion of the plurality of magnetic sources comprise electromagnets.

20. The apparatus of claim 14, wherein the disc substrate having the first form-factor has an outer diameter of about 95 mm, and each of the plurality of magnetic recording discs has an outer diameter of about 27 mm.

\* \* \* \* \*

UNITED STATES PATENT AND TRADEMARK OFFICE
CERTIFICATE OF CORRECTION

| | |
|---|---|
| PATENT NO. | : 8,208,238 B1 |
| APPLICATION NO. | : 12/053138 |
| DATED | : June 26, 2012 |
| INVENTOR(S) | : Paul Stephen Mcleod and Charles F. Brucker |

It is certified that error appears in the above-identified patent and that said Letters Patent is hereby corrected as shown below:

In the Claims

Column 8, line 15, Claim 1: "transfer plate is" should read --transfer plates is--.

Column 8, line 61, Claim 13: "magnetic disc are" should read --magnetic discs are--.

Signed and Sealed this
Eighteenth Day of September, 2012

David J. Kappos
*Director of the United States Patent and Trademark Office*